United States Patent [19]

Jones

[11] 4,262,646
[45] Apr. 21, 1981

[54] CONTROLLED AIR SUPPLY FOR INTERNAL COMBUSTION ENGINES

[75] Inventor: Jeffery C. Jones, Dunlap, Tenn.

[73] Assignee: NBJ Corporation, Lexington, Ky.

[21] Appl. No.: 23,297

[22] Filed: Mar. 23, 1979

[51] Int. Cl.³ ............................................. F02M 31/00
[52] U.S. Cl. ................................... 123/556; 123/552
[58] Field of Search ................... 123/122 D, 556, 552, 123/588

[56] References Cited

U.S. PATENT DOCUMENTS

| | | | |
|---|---|---|---|
| 2,833,261 | 5/1958 | August | 123/122 D |
| 2,846,989 | 8/1958 | Eskew | 123/122 D |
| 3,394,687 | 7/1968 | Scott | 123/122 D |
| 3,830,210 | 8/1974 | Muller | 123/122 D |

Primary Examiner—Ronald H. Lazarus

[57] ABSTRACT

A device is disclosed for controlling the flow of air heated by an internal combustion engine to the vacuum inlet of the carburetor of the engine which includes an elongated duct through which the engine heated air flows and a temperature responsive valve which senses the temperature of the air passing through the duct to thereby control the flow of such air to the vacuum inlet of the carburetor when said temperature reaches a predetermined value.

3 Claims, 2 Drawing Figures

CONTROLLED AIR SUPPLY FOR INTERNAL COMBUSTION ENGINES

Concern about pollutants coming from internal combustion engines is increasing more and more every day. One method of reducing the pollutants from an engine is to increase the air to fuel mixture drawn into the engine. This enables the fuel to burn more completely, thus eliminating a greater percentage of carbon monoxide and other exhaust products. The method described above is carried out by my invention which automatically controls the richness of the heated air to fuel mixture to the engine.

An object of my invention is to provide a device which decreases the pollutants and increases the efficiency of an internal combustion engine.

To insure the highest efficiency in the operation of a internal combustion engine, an explosive mixture of vaporized fuel and hot air is needed. The hot air is supplied by my invention. The air flows through my invention, which lies in contact with the engine's manifold, and heat is transferred to the air as it flows to a vacuum line connected to the carburetor. However, as one knows, a certain period of running time for the internal combustion engine is needed before the manifold is sufficiently hot to serve as an effective heat source for heating the air. During this period of time, if cold air (i.e. cold winter day) is pulled by the vacuum into the engine it will cause the engine to be difficult to start, stalls frequently and runs rough. But, my invention was designed to eliminate these problems. The invention contains a heat controlled valve that does not open til it reaches a pre-set degree. Therefore, the engine does not pull any air form the device til the engine is warm.

An object of my invention is to provide a device that accomplishes the above but is inexpensive and easy to install.

With the above and other objects in view, the invention consists in the novel features of construction, arrangement and combination of parts hereinafter more fully described and finally pointed out in the claim hereto appended.

Figure 1:
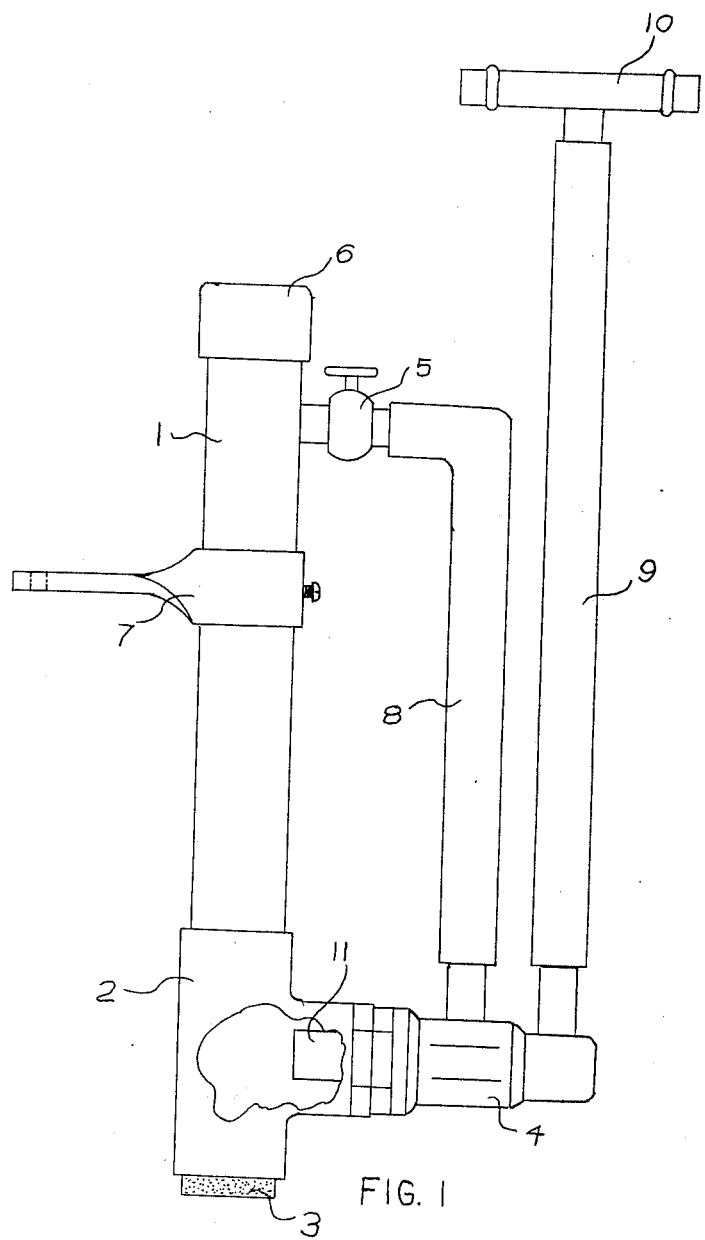
FIG. 1 is a side view completely assembled.

Referring to the drawings: 1 designates the barrel or main body of device, 2 designates the "T" joint for connecting the filter 3 to the barrel, 4 thermostaticly controlled valve, 5 manually controlled valve, 6 designates the cap to the barrel, 7 is the mounting bracket for mounting the device to the engine, 8 hose or pipe connecting thermostaticly controlled valve to manually controlled valve, 9 hose or pipe connecting thermostaticly controlled valve to "T" joint 10 which connects to a vacuum line, 11 designates the sensor on the thermostaticly controlled valve.

FIG. 1 is a side view of my invention. It shows the device completely assembled with a section broken out of the "T" joint 2 which enables one to see the sensor 11. 1 designates the barrel which is made of a section of metal pipe. The barrel is capped at the top by a cap 6. A "T" joint 2 connects together the thermostaticly controlled valve 4 with the filter 3 and barrel 1. The manually controlled valve 5 connects at any suitable place on the barrel that does not interfere with the mounting bracket 7. A hose or pipe 8 transfers the heated air from 5 through the valve 4. 9 designates a hose or pipe which transfers the heated air to "T" joint 10 which relays the heated air to a vacuum line on the engine.

Figure 2:
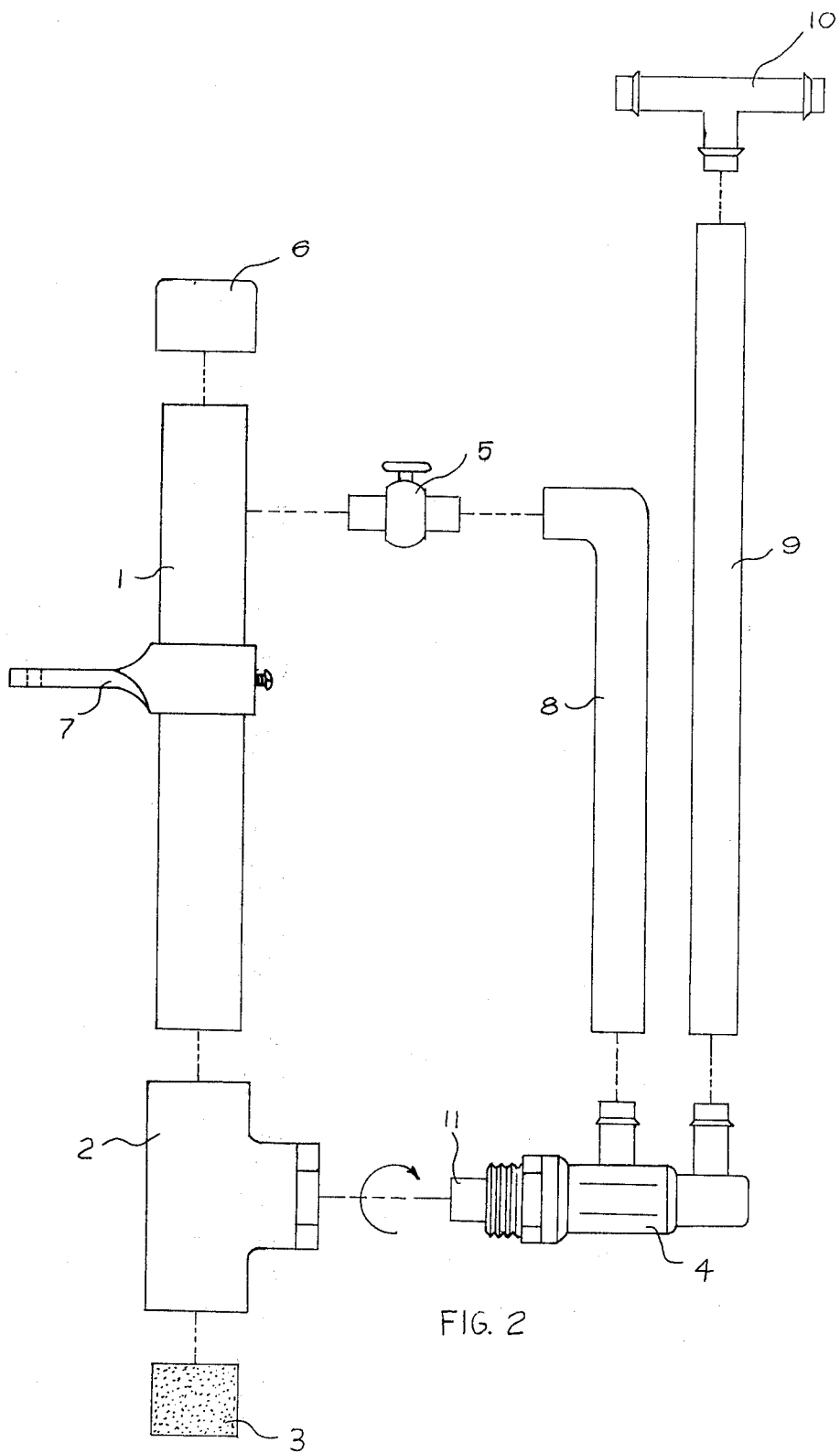
FIG. 2 is a side view showing the parts broke away ready for assembly.

FIG. 2 is a assembly drawing of the device. It shows the same views a FIG. 1 only difference being that each part is separated.

My invention can be mounted anywhere on the engine as long as the filter 3 is placed in contact with a hot surface (i.e. one of the manifolds). Mounting the device on the valve cover of the engine while placing filter 3 in contact with the exhaust manifold is an excellent choice.

The device operates as follows: as the engine warms up, the filter 3 heats up and convection currents cause heat to be transferred to the sensor 11. Once the temperature rises sufficiently the thermostaticly controlled valve 4 opens. This opens a passage which permits the engine's vacuum to draw air through the hot filter 3 (heating the air as in passes through) and into the engine.

Having thus described my invention, what I claim as new and desire to secure by letters patent is:

1. In an internal combustion engine a device for controlling a flow of heated air to the vacuum inlet of the carburetor of said engine, said device comprising:
   (1) an elongated duct means having an inlet and an outlet through which said heated air flows,
   (2) a chamber means having an outlet opening connected to said inlet of said duct means, an inlet opening for receiving said air heated by said internal combustion engine, and an opening intermediate said outlet and inlet openings,
   (3) temperature responsive valve means having an inlet opening and an outlet opening, said valve means having a temperature sensor means operably positioned in said intermediate opening of said chamber to sense the temperature of said air heated by said engine to control thereby the flow of air through said valve from said inlet opening thereof to said outlet opening thereof,
   (4) manually controlled valve means interconnected between said outlet of said air intake duct and said inlet opening of said temperature responsive valve means to control the overall quantity of air flowing into said inlet opening of said temperature responsive valve, and
   (5) means connecting said outlet of said temperature responsive valve means to said vacuum inlet of said carburetor whereby as said engine heats up, said temperature responsive valve means opens to permit warmed air to be drawn through said device into said vacuum inlet of said carburetor.

2. The device as set forth in claim 1 wherein said engine has an exhaust manifold and said inlet opening of said chamber means is positioned adjacent said exhaust manifold.

3. The device as set forth in claim 2 further comprising powdered metal air filter means positioned between said inlet of said chamber means and said exhaust manifold.

* * * * *